United States Patent Office 3,438,287
Patented Apr. 15, 1969

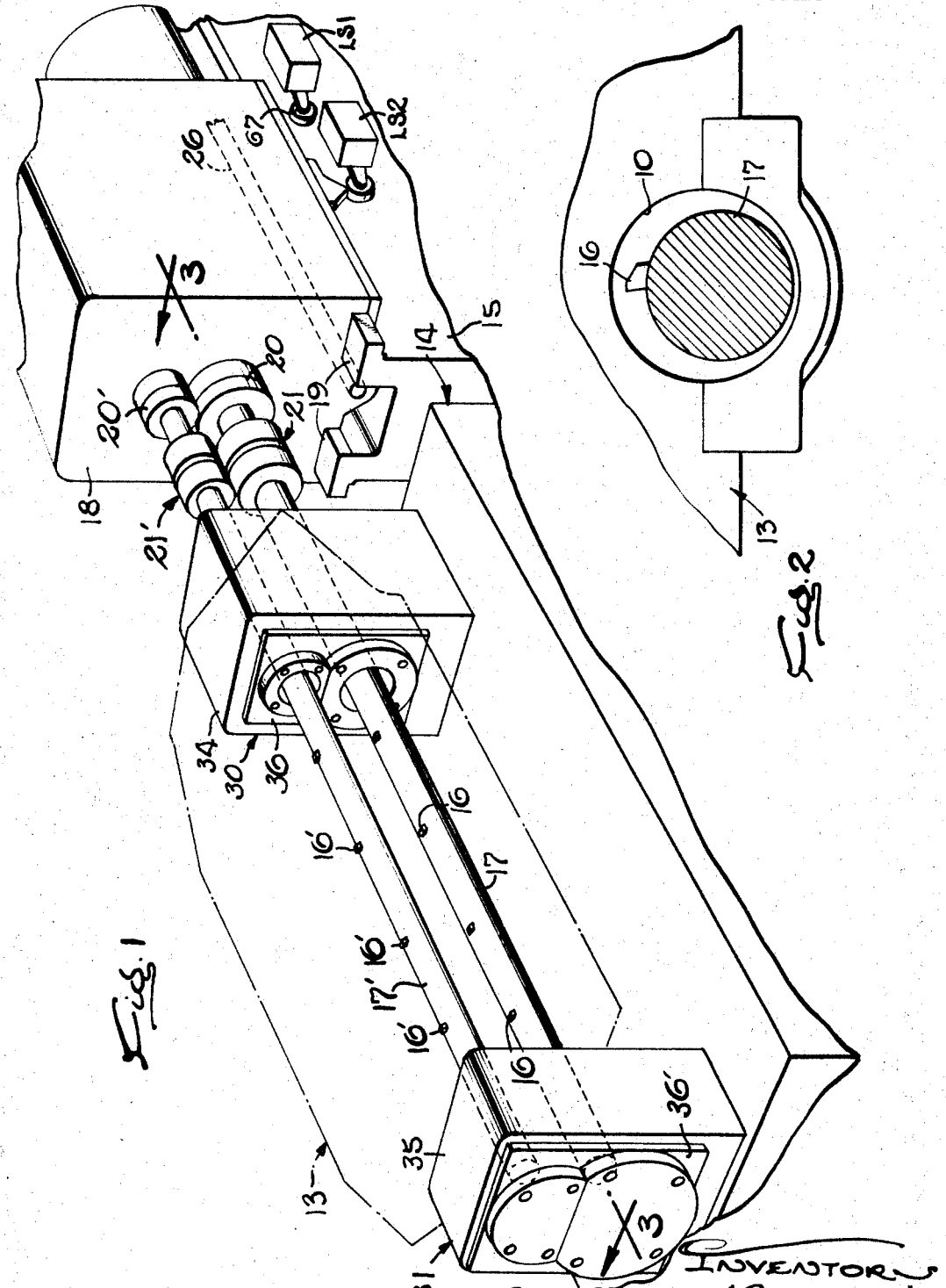

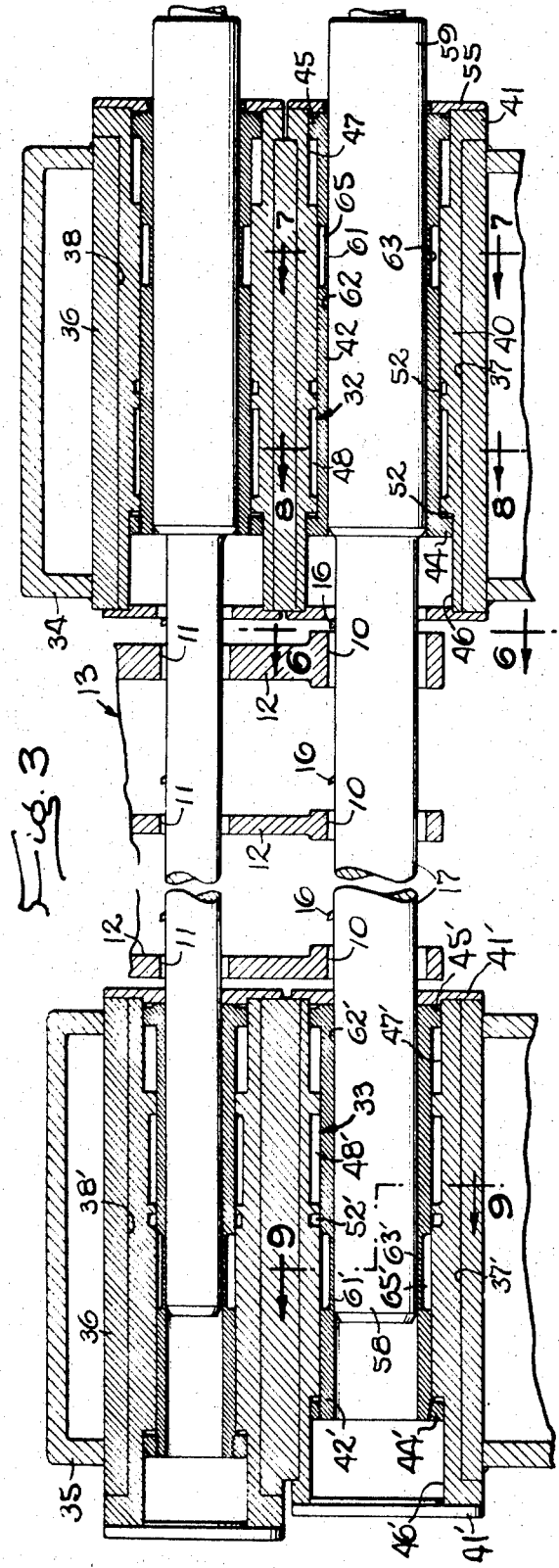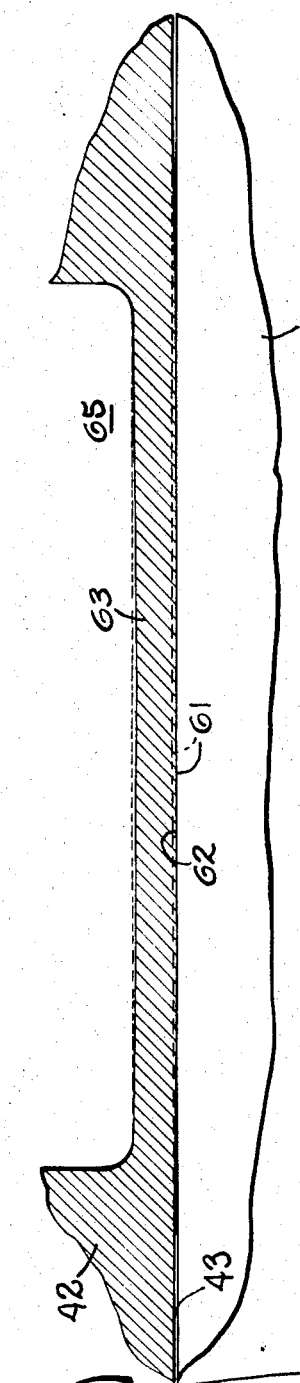

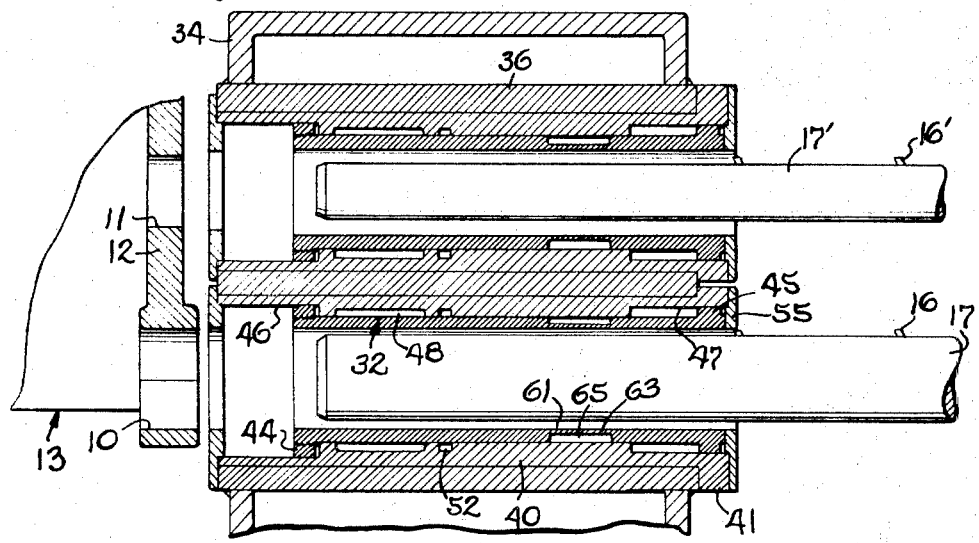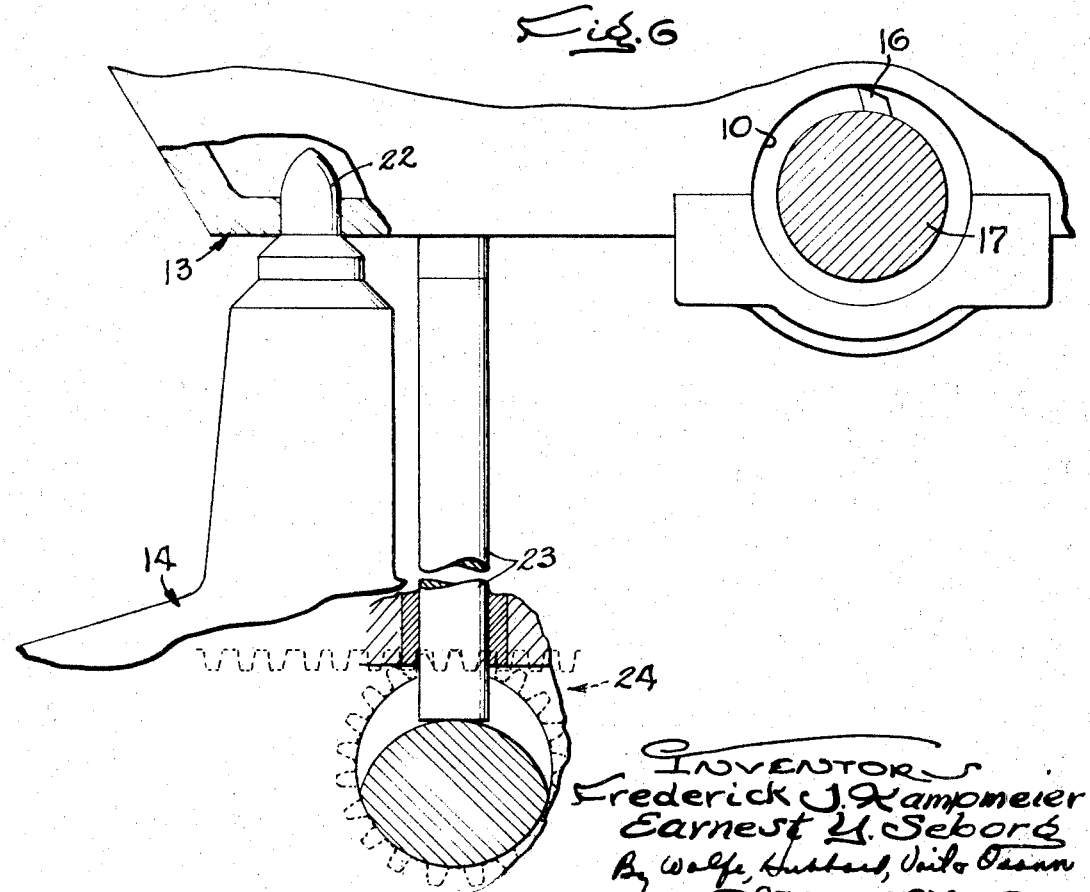

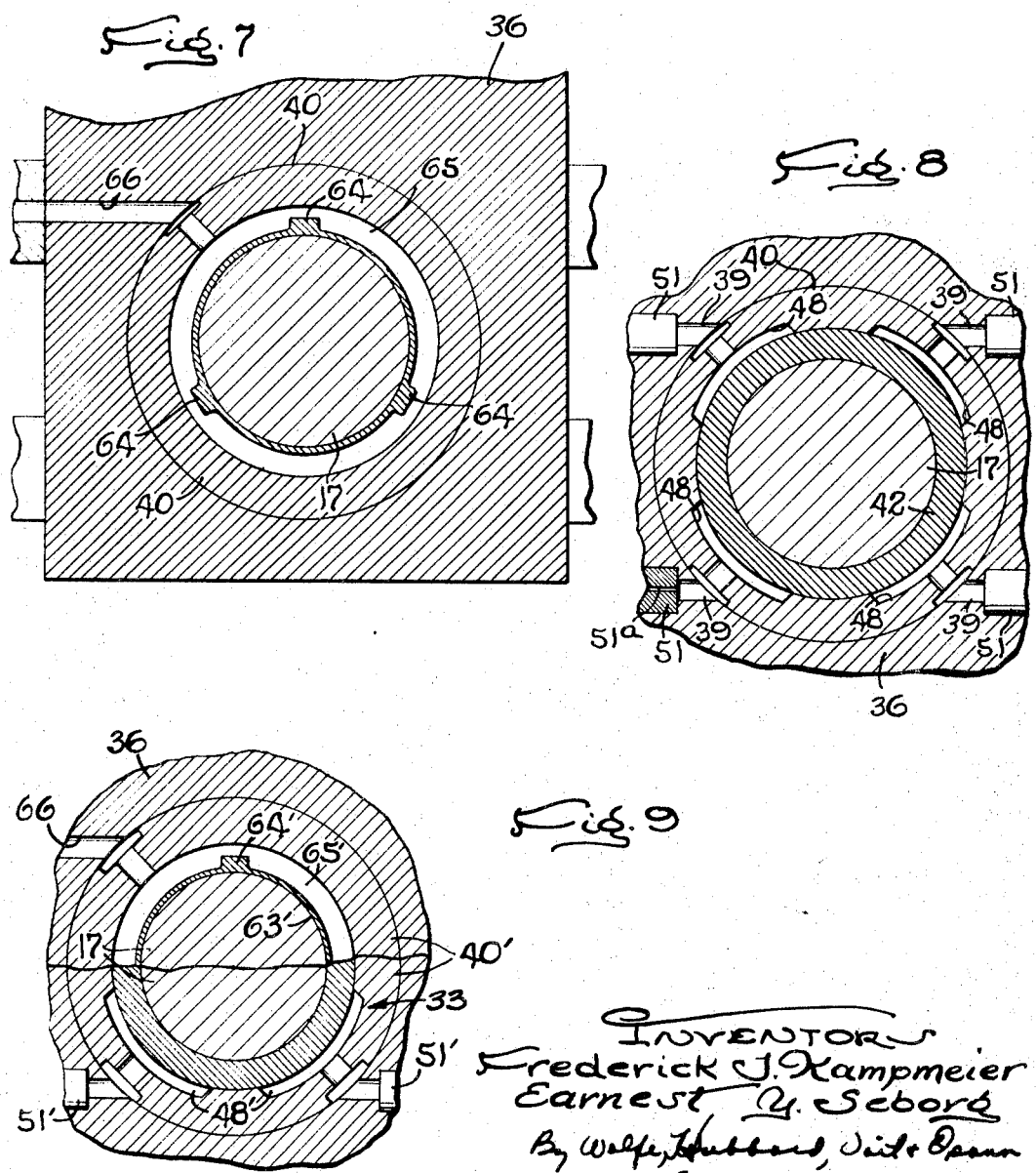

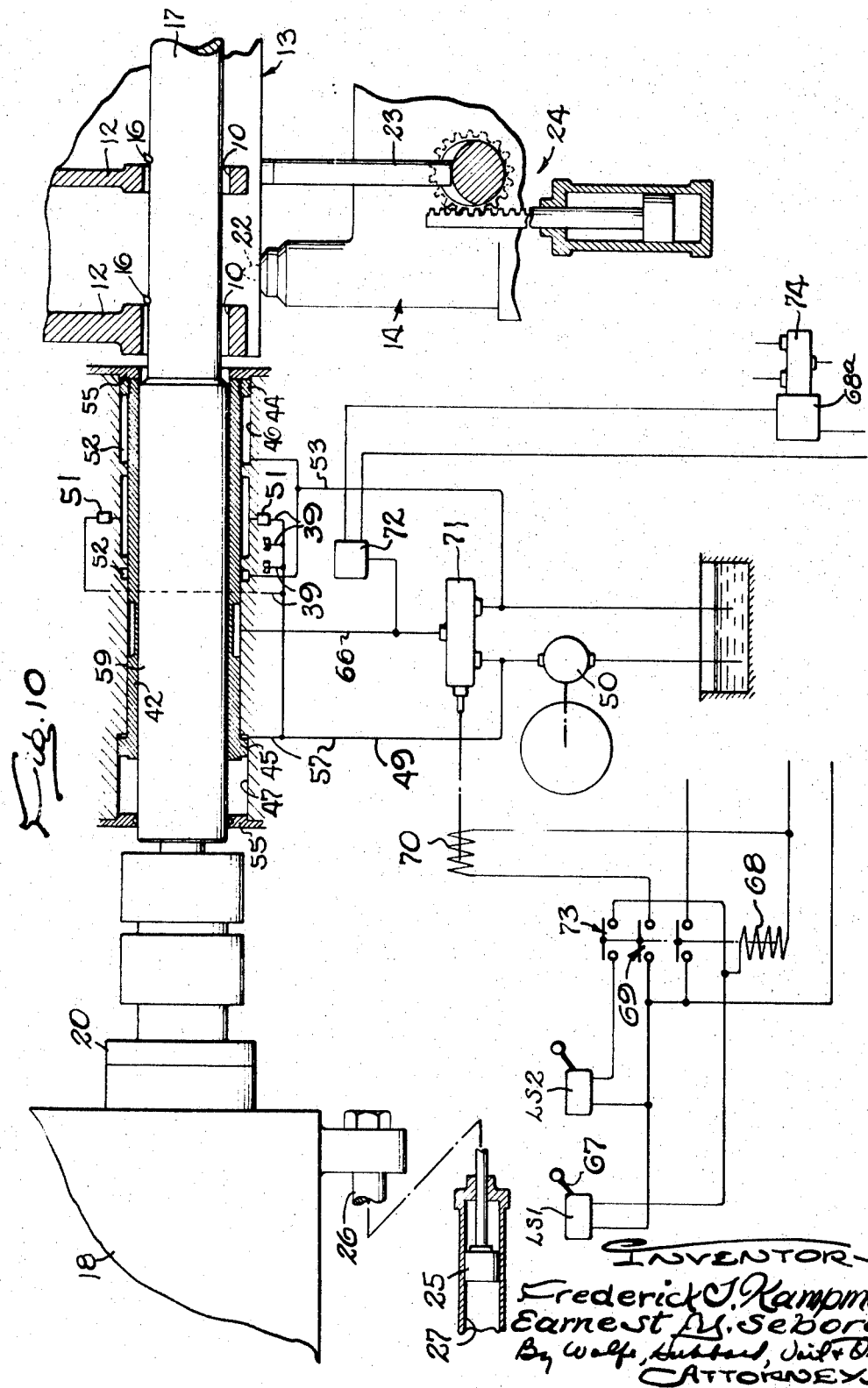

3,438,287
BEARING SUPPORT FOR TOOL SPINDLES
Frederick J. Kampmeier and Earnest Y. Seborg, Rockford, Ill., assignors to The Ingersoll Milling Machine Company, Rockford, Ill., a corporation of Illinois
Filed May 1, 1967, Ser. No. 634,957
Int. Cl. B23b 29/02, 47/00
U.S. Cl. 77—56     16 Claims

ABSTRACT OF THE DISCLOSURE

For boring out alined holes in a workpiece, a rotary spindle carrying boring teeth is mounted cantilever fashion on a power reciprocated head which is advanced rapidly to slide the spindle freely through a bearing bushing and the work bores and into an outboard bearing bushing to position cutter teeth on the spindle adjacent the holes to be bored. In reaching this position, the spindle is coupled automatically to the bushings which rotate and shift axially with the spindle in the continued advance of the head to feed the tools to the work. The bushings are telescoped within stationary sleeves which contain hydrostatic bearing pads that allow for such rotation and shifting of the bushings while supporting the spindle precisely during the boring.

Background of the invention

This invention relates to machine tools such as boring machines in which a head carrying a projecting tool spindle is advanced, usually at a rapid rate, to project the spindle through one or more bearing supports to bring a tool into operative position for effecting machining of the workpiece as the advance of the head is continued at a feed rate. In prior machine tools of this type, the clearances required to enable the spindle to slide through the bearing bushings that support the spindle during the machining impose fixed limitations on the accuracy of the machining.

Summary of the invention

The present invention achieves far greater precision than has been possible heretofore in machining operations of the above character by providing a hydrostatic bearing which supports the spindle accurately during the machining but allows for free and independent axial sliding of the spindle in the bearing during the approach of the tool to working position. For this purpose, stationarily mounted hydrostatic bearing pads support for rotation and limited axial feeding a bearing bushing through which the spindle slides freely during the tool approaching movement but which, near the end of such approach, becomes coupled rigidly and preferably automatically to the spindle so that, during the machining operation, the spindle is supported by the hydrostatic pads through the medium of the bushing which rotates and shifts axially within the pads. As a result, the hydrostatic bearing is not called upon to accommodate the usually long range of the tool approaching movement of the spindle.

The invention further resides in the novel manner of mounting the bearing bushing and positioning the same axially in the course of a machine cycle and also in the manner of effecting and timing the coupling of the spindle and the bearing bushings.

Brief description of the drawings

FIGURE 1 is a fragmentary perspective view of a boring machine embodying the novel features of the present invention.

FIG. 2 is a fragmentary cross-section through the spindle and workpiece during insertion of the spindle.

FIG. 3 is a fragmentary section taken along the line 3—3 of FIG. 1.

FIG. 4 is an enlargement of a part of FIG. 3.

FIG. 5 is a part of FIG. 3 showing the tool spindle in retracted position.

FIG. 6 is a fragmentary view taken along the line 6—6 of FIG. 3.

FIGS. 7, 8 and 9 are fragmentary sections taken along the lines 7—7, 8—8 and 9—9 of FIG. 3.

FIG. 10 is a schematic view and fragmentary circuit diagram.

Description of the preferred embodiment

For purposes of illustration, the invention is shown in the drawings incorporated in a machine tool of the type commonly used for finish boring the cam and crankshaft bearing holes 10 and 11 in the crosswebs 12 of an engine block 13 while the latter is secured to and located accurately in a fixture 14 on a bed structure 15. Boring of the crankshaft holes 10 is effected by short teeth 16 spaced along and projecting radially from a tool spindle or bar 17 projecting cantilever fashion from a head 18 which is supported by the bed to slide back and forth along ways 19. The tool spindle is alined with and supported through the medium of a floating tool holder 21 mounted on the outer end of a drive spindle 20 which is journaled in the head 18 to aline the axes of the tool spindle and the holes 10 as shown in FIG. 5 when the workpiece is in boring position. The holder 21 which may be a standard Ziegler holder allows for limited transaxial floating of the tool spindle to compensate for slight misalinement between the tool spindle and bearing bushings later to be described.

Conventional means (not shown) operates after completion of each boring operation to stop the rotation of the spindles 17 and 20 with each tooth 16 in the predetermined upright position shown in FIGS. 1 and 6. While the boring bar is being projected through the rough holes and during retraction from the finished holes, the fixture is shifted vertically to offset the bores 10 along the radius of the positioned tooth and to the position shown in FIG. 2, the cutter teeth thus being adapted to pass through the hole walls without contact during the advance and retraction of the spindle. After being loaded into the fixture, a workpiece, while engaging dowels 22 (FIG. 6) is supported by plungers 23 adapted to be raised and lowered by a suitable actuator 24 activated at proper times in the machine cycle.

The spindles are driven at proper speed by an electric motor in the head 18 and the latter is advanced and retracted by a suitable power actuator which may, as shown, be of the hydraulic type comprising a piston 25 having a rod 26 secured to the head and slidable in a cylinder 27 secured to the bed. Conventional mechanism (not fully shown) is provided for controlling the flow of fluid to opposite ends of the cylinder to advance and retract the tool head 18 in an automatic cycle including first advancing the spindle and tools rapidly from the retracted position (FIG. 5) to the position shown in FIG. 3, then continuing the advance of the head at a slower feed rate to effect the boring, and finally retracting the spindle rapidly out of the workpiece to the starting position. Such control of the head actuator may be effected through conventional circuitry by a switch LS1 (FIGS. 1 and 10) actuated when the head completes the rapid approach (FIG. 3), a switch LS2 which is actuated when the boring of the work holes is completed, and a switch which interrupts the rapid return of the head in the starting position. With the spindle retracted, the work may be unloaded from the fixture and another piece placed thereon.

In prior machines of the above character, the spindle has been supported during the boring and at opposite ends by plain bearings through which the spindle may be slide during the rapid approach movement of the head by virtue of the clearances provided to accommodate the sliding. Such clearances impose a fixed limitation on the accuracy with which the bores may be formed. As applied to machine tools of the above character, the present invention provides inboard and outboard bearing supports 30 and 31 at opposite ends of the workpiece in the fixture 14, each support being constructed to permit free sliding of the tool spindle therethrough to accommodate the long rapid approach movement but adapted to take up the sliding clearances automatically and, during the continued feeding and the boring to support the spindle precisely through the medium of hydrostatic bearings 32 and 33. As during the rapid approach, these bearings remain inactive during the rapid return of the spindle and the head.

Herein the bearing supports include casings 34 and 35 rigidly secured to and upstanding from the top of the bed 15 beyond opposite ends of the fixture 14 and enclosing and welded to solid blocks 36 which are formed with bores whose walls 37 and 38 are closely concentric with the axis of the spindle 17. The inboard bearing support 30 includes a sleeve 40 which extends through and is telescoped closely within the bore 37 and is fixed thereon by abutting caps 41 secured against the ends of the block 36. Axially slidable within the sleeve 40 is a bushing 42 which is supported by the hydrostatic bearing 32 and which receives the tool spindle 17 with ample sliding clearance 43 (FIG. 4), and becomes coupled to the spindle for the boring operation. To accommodate the full range of feeding of the spindle during the boring, outturned flanges 44, 45 at opposite ends of the bushing are slidable in internal cylindrical end portions 46 and 47 of the sleeve.

The hydrostatic bearing is constructed in accordance with well-known design techniques and herein comprises four pressure pads supplied with oil under high pressure, for example 1,000 p.s.i., each pad comprising a rectangular chamber 48 formed in the inner wall of the sleeve 40 and opening toward the outer cylindrical surface of the bushing. A continuous flow of oil at substantially constant pressure from the outlet of a high pressure pump 50 is delivered to the pads through individual branch passages 39 in the block 36 each including a compensating element 51 in the form of an orifice 51a (FIG. 8) whose diameter, for example .025 of an inch, may be fixed or, if desired, variable to provide a constant pressured drop. The orifice size is correlated with the pad pressure and the sill clearances, for example .0025 of an inch, around the pad and between the opposed walls of the sleeve and bushing. The arrangement is such that flow of pressure fluid to the pads balances the escape of fluid outwardly through the laminar flow passages or clearances. The escaping fluid collects in annular grooves 52 in the sleeve and flows to the drain line 53 through passages in the block 36.

The brushing 42 thus mounted is supported rigidly by the oil in the pads but floats thereon and automatically adjusts for and accommodates changes in radial loading in the manner well understood in the hydrostatic bearing art. Thus, the bushing is always held centered precisely within the sleeve in spite of fluctuating radial loads that are imposed on the spindle and the coupled bushing during the boring.

Provision is made for continuously urging the bushing 42 axially and toward the head 18 to a position which, when the spindle is retracted as shown in FIG. 5, is determined by abutment of the bushing end and a flange 55 on the cap 41 at the inboard end of the sleeve 40. For this purpose, the bushing flange 45 is utilized as a piston slidable in the cylinder 47 which communicates continuously through a line 57 with the outlet of the pump. The force exerted on the piston 45 is easily overcome in the advance of the head after coupling of the bushing to the spindle as later described.

The construction of the outboard bearing support 35 for receiving the free end portion 58 of the tool spindle near the end of the rapid approach movement and supporting the same during the boring is essentially the same as that of the inboard bearing except for the internal diameter of the bushing 42'. Accordingly, the corresponding parts are indicated by the same but primed reference numerals. That portion 59 of the spindle which is disposed in the inboard bushing 42 during the boring operation is made somewhat larger than the combined diameter of the rest of the spindle and each tooth 16 so that substantially the full length of the spindle may be retracted through the bushing and beyond the inboard end of the workpiece as shown in FIG. 5.

As stated above, an important aspect of the present invention is the provision for rigid coupling of the spindle 17 and the bushings 42 and 42' near the end of the rapid approach movement of the head 18 to take up the sliding clearances 43 between the spindle and the bushings so that in the continued advance of the head, the spindle is supported accurately by the hydrostatic bearings 32 and 33 through the medium of the respective bushings 42 and 42' which, during the boring, shift axially with the spindle and within the bearing pads to accommodate the relatively short feed required for the boring. Such coupling is effected mechanically and preferably automaticaly in timed relation to the advance of the head 18 by the engagement of coupling elements 61 and 62 herein comprising the opposed inner and outer surfaces of the bushing 42 and the spindle 17. As disclosed in an application of Karl B. Kaiser, Ser. No. 635,149, filed May 1, 1967, these coupling elements may be complemental tapers that seat together automatically when the spindle reaches the desired coupling position.

In the present instance, the coupling surfaces 61, 62 are cylindrical, one being on a rigid part of the spindle and the other the internal surface of one or more thin and radially flexible webs 63 which may be formed by cutting away substantial lengths of the metal of the bushing around the latter. Preferably, the web is divided into a plurality of angularly spaced aparts joined at adjacent ends by rigid ribs 64 paralleling the bushing axis and rigidly spanning opposite end portions of the bushing. The webs 63 define the bottom of arcuate chambers 65 coacting with the interior of the sleeve 40 to form a hydraulic actuator servo which is energized by the admission of pressure fluid from the pump outlet to a passage 66 leading to the chamber. The area of the web is such that under the pump pressure enough friction is created by inward flexing of the webs 63 and the gripping of the spindle to maintain the spindle and bushing coupled rigidly for rotation and axial shifting in unison during the continued forward feeding of the spindle by the head.

The normally open switch LS1 above described may be utilized to control the energization of the actuator of the squeeze clamp thus formed and couple the spindle 17 to the bushing 40 at the proper time in the advance of the spindle. When the head depresses the switch follower 67 and interrupts the rapid approach movement (FIG. 3), a solenoid 68 is energized and closure of its switch 69 energizes a solenoid 70 to open a valve 71 thus admitting pressure fluid to the spaces 63 to activate the squeeze clamp. The chambers 63 and 63' of the two squeeze clamps are connected in parallel in the hydraulic system so that the clamps are energized simultaneously, both of the bushings 42 and 42' thus being coupled to the opposed portions of the tool spindle.

Energization of the solenoid 68 closes a switch 73 which maintains such energization. In response to the ensuing build-up of pressure in the chambers 63 of the squeeze clamps, a pressure switch 72 is actuated and coacts with a solenoid 68a in a well known manner to actuate a valve 74 by which rotation of the spindle is initiated and pressure fluid from the pump is admitted to the head end of the cylinder 27 but at a reduced rate so as to continue the advance of the head 18 at the desired rate for feeding the tools 16 to and through rough holes to effect the boring.

After the tools have been fed through and finished the bores 10, the head engages and depresses the follower of the normally closed switch LS2 thus opening the switch to deenergize the solenoid 68 which results in interrupting the rotation of the spindle with the boring teeth in upright position (FIG. 6), deenergization of the solenoid 70 to release the pressure within the squeeze clamp chambers 48, shifting of the workpiece by the plungers 23 to the position shown in FIG. 2, and the supply of pressure fluid to the rod end of the cylinder 27 to return the head 18 rapidly to starting position (FIG. 5). In accordance with conventional practice, suitable interlocks are employed in the circuitry to insure the above sequence of operation in executing the cycle above described automatically in response to the advance and retraction of the tool head.

The tools 16' for boring the camshaft holes 11 are carried by a spindle 17' whose mounting duplicates that of the spindle 17 and need not be described.

In machine tools of the type illustrated, it is desirable to support the spindle by both the inboard and outboard bearings 32 and 33 described. For machining other types of workpieces, only one such bearing support will be required, and this may be located either at the inner or the outer end of the spindle. Also, the invention is applicable to machine tools in which the rapid approach, feed and return are effected by moving the work support instead of the tool head as above described. Therefore, reference in the claims to movement of the tool spindle is intended to include such reversal of motion.

We claim:

1. In a machine tool, the combination of, two supports mounted for relative movement along a straight path, a power rotated spindle mounted cantilever fashion on the movable one of said supports and projecting therefrom along said path, a bushing for receiving said spindle in telescoped relation, means on the other support providing a hydrostatic bearing surrounding said bushing and supporting the same for rotation about and for axial movement along a precisely located axis substantially coincident with the axis of said spindle, mechanism for advancing said movable support along said path to approach a tool on said spindle to a workpiece on the other support, move the spindle axially within said bushing, and then continue such advance for machining the workpiece, and coupling elements on said bushing and spindle adapted for engagement during said advance and operable by such engagement to center the spindle precisely on the bushing axis and maintain the spindle and bushing coupled together rigidly for rotation and shifting in unison within said hydrostatic bearing.

2. The combination as defined in claim 1 in which said coupling elements are opposing surfaces freely movable axially relative to each other during said approaching advance and formed on the interior and exterior of said bushing and spindle respectively.

3. The combination defined in claim 1 in which the coupling of said bushing and spindle by said elements is effected automatically when said spindle has advanced relative to said bushing to a predetermined position.

4. The combination defined by claim 3 in which the automatic coupling of said spindle and bushing by engagement of said elements occurs near the end of said approaching advance and remains effective during said workpiece machining.

5. The combination as defined in claim 4 in which said movable support is advanced at a reduced feed rate during machining of the workpiece and while the spindle and bushing are coupled rigidly together by said elements.

6. The combination as defined in claim 3 in which said coupling elements are disengaged from each other automatically as an incident to retraction of said movable support after said continued advance whereby to permit free sliding of the spindle through said bushing.

7. The combination defined in claim 1 in which said hydrostatic bearing includes a sleeve closely telescoped around said bushing and mounted on said other support in an axially fixed position, a plurality of recesses formed in and spaced angularly around the interior of said sleeve, and means for supplying fluid under high pressure to said recesses and thereby form hydrostatic bearing pads supporting the bushing while permitting axial movement thereof after coupling to the spindle.

8. The combination as defined in claim 7 including means mounted on said other support and continuously acting on said bushing to urge the same relative to said sleeve in a direction opposite to said spindle advance and maintain the bushing in a normal retracted position while the bushing is uncoupled from the spindle.

9. The combination as defined in claim 8 in which said last mentioned means includes piston and cylinder elements, one on the interior of said sleeve and the other on the exterior of said bushing, coacting to form a hydraulic actuator continuously urging said bushing toward a retracted position and maintaining the same in such position after retraction of the spindle.

10. The combination as defined in claim 1 in which said coupling elements are movable relative to each other radially of said spindle and including a power actuator adapted when energized to effect engagement of the coupling elements, and means for energizing said actuator after said spindle has slid along said bushing to a predetermined position.

11. The combination as defined in claim 1 including an arcuate fluid chamber formed in and extending around the exterior of said bushing and in which one of said coupling elements is a thin part of said bushing defining the inner wall of said chamber and radially flexible into gripping engagement with the surface of said spindle, and means for increasing the pressure in said chamber to a value sufficiently high to contract said wall against the spindle and maintain the spindle and bushing coupled together rigidly during said continued advance.

12. The combination as defined in claim 11 including means responsive to the movement of said movable support and operable automatically to increase the pressure in said chamber when the movable support reaches a predetermined position.

13. The combination as defined in claim 12 including means operable automatically when said movable support in said continued advance reaches a predetermined position to release the pressure in said chamber whereby to uncouple the spindle from said bushing.

14. The combination as defined in claim 13 in which the admission to and the release of pressure fluid from said chamber is effected in response to the relative movement between said supports.

15. The combination of two supports mounted for relative movement back and forth along a straight path through a predetermined range, a power rotated spindle mounted cantilever fashion on the movable one of said supports and projecting therefrom along said path, two bushings alined axially and spaced along the other of said supports each for receiving said spindle in telescoped relation, hydrostatic bearings on said other support surrounding said bushings and supporting the same for rotation about and for axial movement along a precisely located axis, means for relatively moving said supports along said path to correspondingly and initially advance the spindle and bushings axially relative to each other, and coupling means operable when said movable support reaches a predetermined position in said advance for taking up the clearance between said bushings and said spindle, center the spindle precisely in both of the bushings, and maintain both bushings coupled rigidly to said spindle while said advance is continued.

16. The combination as defined by claim 15 in which said coupling means is rendered operative automatically after relative sliding of said spindle through said bushing to a predetermined position.

References Cited
UNITED STATES PATENTS

| | | | |
|---|---|---|---|
| 2,432,943 | 12/1947 | Shaw | 77—57 |
| 2,643,554 | 6/1953 | Sperisen | 77—3 |
| 2,671,700 | 3/1954 | Seyffert | 308—9 |
| 3,189,389 | 6/1965 | Heer | 308—9 |
| 3,244,028 | 4/1966 | Dever et al. | 77—1 |
| 3,382,739 | 5/1968 | Jacobson | 77—56 |

GERALD A. DOST, *Primary Examiner.*

U.S. Cl. X.R.

77—1; 82—30; 308—5, 9